United States Patent
Lee et al.

(10) Patent No.: US 10,843,182 B2
(45) Date of Patent: Nov. 24, 2020

(54) COMPOSITE MATERIAL COMPRISING POROUS SILICATE PARTICLES AND ACTIVE METALS

(71) Applicant: INDUSTRIAL TECHNOLOGY RESEARCH INSTITUTE, Hsinchu (TW)

(72) Inventors: Nien-Tsu Lee, Hsinchu (TW); Huan-Yi Hung, Hsinchu (TW); Chien-Wei Lu, Hsinchu (TW); Hsien-Hui Tai, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 79 days.

(21) Appl. No.: 16/190,218

(22) Filed: Nov. 14, 2018

(65) Prior Publication Data
US 2019/0151837 A1 May 23, 2019

Related U.S. Application Data
(60) Provisional application No. 62/587,518, filed on Nov. 17, 2017.

(51) Int. Cl.
| | | |
|---|---|---|
| *B32B 5/16* | (2006.01) | |
| *B01J 39/02* | (2006.01) | |
| *C02F 1/28* | (2006.01) | |
| *C02F 1/42* | (2006.01) | |
| *B01J 39/14* | (2006.01) | |

(Continued)

(52) U.S. Cl.
CPC ............. *B01J 39/02* (2013.01); *B01J 39/14* (2013.01); *C02F 1/288* (2013.01); *C02F 1/42* (2013.01); *C02F 1/281* (2013.01); *C02F 2101/103* (2013.01); *C02F 2101/20* (2013.01)

(58) Field of Classification Search
CPC .................................. C02F 1/281; C03C 11/00
See application file for complete search history.

(56) References Cited

U.S. PATENT DOCUMENTS

| | | | |
|---|---|---|---|
| 10,052,623 B2 * | 8/2018 | Tsai ........................ | C03C 4/18 |
| 2008/0124558 A1 * | 5/2008 | Boek ....................... | C03C 3/066 |
| | | | 428/427 |

(Continued)

FOREIGN PATENT DOCUMENTS

| | | |
|---|---|---|
| CN | 102049258 | 5/2011 |
| CN | 102515195 | 6/2012 |

(Continued)

OTHER PUBLICATIONS

Taiwanese Office Action for Taiwanese Patent Application No. 107140635 dated Feb. 27, 2019.

*Primary Examiner* — Hoa (Holly) Le
(74) *Attorney, Agent, or Firm* — Amin, Turocy & Watson, LLP (57) ABSTRACT

Provided is a composite material including a plurality of porous silicate particles having a glass phase structure, a first active metal adsorbed into the glass phase structure of the porous silicate particles, and a modified layer containing a second active metal formed on the surfaces of the porous silicate particles. The porous silicate particles have an average pore diameter of from 3 nm to 50 nm, and the first active metal includes at least one of sodium, potassium, calcium, and magnesium.

12 Claims, 7 Drawing Sheets

(51) Int. Cl.
     *C02F 101/20*     (2006.01)
     *C02F 101/10*     (2006.01)

(56) References Cited

U.S. PATENT DOCUMENTS

2016/0375422 A1    12/2016  Tsai et al.
2016/0375433 A1*   12/2016  Tsai ........................ B01J 39/14
                                                            210/661

FOREIGN PATENT DOCUMENTS

| | | |
|---|---|---|
| CN | 102908982 | 2/2013 |
| CN | 103230771 | 8/2013 |
| CN | 103721292 | 4/2014 |
| CN | 104815611 | 8/2015 |
| CN | 105621445 | 6/2016 |
| CN | 106477592 | 3/2017 |
| CN | 106914213 | 7/2017 |
| TW | 200424011 | 11/2004 |
| TW | 200611281 | 4/2006 |
| TW | I270899 | 1/2007 |
| TW | 200831427 | 8/2008 |
| TW | I308506 | 4/2009 |
| WO | 2009/140847 | 11/2009 |

\* cited by examiner

COMPOSITE MATERIAL COMPRISING POROUS SILICATE PARTICLES AND ACTIVE METALS

CROSS-REFERENCE TO RELATED APPLICATION

The present application is based on, and claims priority from U.S. Provisional Patent Application Ser. No. 62/587,518, filed on Nov. 17, 2017, the disclosure of which is hereby incorporated by reference herein in its entirety.

TECHNICAL FIELD

The present disclosure relates to a composite material having a modified layer with an active metal.

BACKGROUND

The commercial adsorption material or carrier material for waste metal adsorption is restricted to the property itself, and may be used on certain substrate or in specific environment. For example, the adsorption capacity of most of the adsorption materials under acidic environment may be reduced. In addition, the breakdown phenomena of the adsorption materials may even happen under certain circumstances. Therefore, the application area of the adsorption material would be strongly restricted.

Accordingly, it is an urgent issue to develop a more convenient and efficient composite material for adsorbing the contamination of a heavy metal in water under highly acidic conditions. Therefore, the present disclosure is to provide a composite material made from the common soda-lime glass or LCD panel glass for efficiently removing harmful substance from wastewater.

SUMMARY

In the present disclosure, the composition and chemical structure of LCD panel glass are reconfigured by using a modifier, based on the physical and chemical properties of the LCD panel glass, so as to retain its stability in a highly acidic, highly basic, highly salty or highly organic/inorganic contaminated substance environment, while altering its surface properties to increase chemical activity and physical absorptivity. As a result, the common soda-lime glass or the waste LCD panel glass can be used as a raw material to prepare a highly adsorbable and recyclable modified-composite material (abbreviated hereinafter as "composite material") for removing a harmful substance from wastewater.

The present disclosure provides a composite material, including a plurality of porous silicate particles each having a glass phase structure; a first active metal adsorbed into the glass phase structure of the porous silicate particles; and a modified layer containing a second active metal thereof formed on surfaces of the porous silicate particles. The porous silicate particles have an average pore diameter of from 3 nm to 50 nm, and the first active metal includes at least one of sodium, potassium, calcium, and magnesium.

DETAILED DESCRIPTIONS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Unless specified in the context, the singular forms, "a", "an" and "the", used in the specification and the appended claims include the plural forms.

In the present disclosure, the term "glass phase" refers to an amorphous semi-solid state. Further, since the structure of silicate with a glass phase structure is very complicated, the composition of silicate is expressed as an oxide of each metal, rather than a salt form. The term "heavy metal" includes transition metals and metalloid element arsenic having biotoxicity.

The disclosure of U.S. patent application Ser. Nos. 15/195,216 and 14/966,536 are hereby incorporated by reference herein in its entirety.

In the present disclosure, common soda-lime glass or waste LCD panel glass is used as a raw material for preparing a composite material. The method for preparing the composite material includes the following steps. Firstly, silicate powder produced by using waste LCD panel glass as a raw material, a first active metal compound and a second metal compound are prepared. Secondly, the silicate powder is reacted with the first metal compound at a reaction temperature of from 800° C. to 1500° C., so as to form a plurality of porous silicate particles having a glass phase and allowing the first active metal to be adsorbed into the glass phase structure of the porous silicate particles. In one embodiment, the porous silicate particles have an average pore diameter of from 3 nm to 50 nm. Thirdly, the porous silicate particles are reacted with a second active metal, allowing a modified layer containing a second active metal formed on the surfaces of the porous silicate particles.

Specifically, the silicate powder can be prepared by pulverizing the common soda-lime glass or the waste LCD panel glass. The particle diameter of the silicate powder is not particularly limited, and it can be, for example, from micrometers to millimeters. The components of the silicate powder include silicon oxide, aluminum oxide, boron oxide, barium oxide and cesium oxide, wherein the amount of boron oxide is higher than 5%, based on the weight of the silicate powder. In one embodiment, the silicon oxide and the aluminum oxide in the component of the porous silicate particles are at a weight ratio of from 2 to 5.

In some embodiments, the common soda-lime glass or the waste LCD panel glass can be used to prepare the silicate powder. Therefore, the components of the silicate powder can further include sodium oxide, magnesium oxide, and calcium oxide.

In one embodiment the first active metal includes at least one of sodium, potassium, calcium, and magnesium. Specifically, the first active metal compound may include at least one of sodium carbonate, potassium carbonate, calcium carbonate and magnesium carbonate.

In one embodiment, the second active metal includes at least one of ferrum, copper, group IA elements, and group IIA elements. Specifically, the second active metal may be obtained from ferric oxide, copper oxide, oxides of group IA elements or group IIA elements, ferric nitrate, copper nitrate, or a mixture of sodium hydroxide and sodium carbonate. In some embodiments, the porous silicate particles are reacted with a second active metal in an autoclave or heated by microwave, allowing a modified layer containing a second active metal formed on the surfaces of the porous silicate particles. More specifically, the second active metal is presented in metal ion form such that a plurality of metal ions are bonded to the pore walls and surfaces of the porous silicate particles. In another embodiment, the porous silicate particles have a negative zeta potential, allowing to be bonded with the second active metal to form the composite material which has a zeta potential of near zero value.

In one embodiment, the porous silicate particles have a specific surface area of from 50 $m^2$/g to 400 $m^2$/g. In another embodiment, the porous silicate particles have a specific surface area of from 50 $m^2$/g to 100 $m^2$/g while the second active metal is selected from at least one of group IA elements or group IIA elements. In still another embodiment, the modified layer has layered crystal structures formed on the surfaces of the porous silicate particles while the second active metal is group IA or IIA metal.

In one embodiment, the porous silicate particles have a specific weight of from 0.5 g/$cm^3$ to 0.8 g/$cm^3$. In another embodiment, the modified layer has a weight ratio of between 0.1 wt % to 2 wt % based on the total weight of the composite material. For example, the modified layer has a weight ratio of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8, wt %, 1.9 wt %, or 2 wt % based on the total weight of the composite material.

The porous silicate particles of the composite material of the present disclosure having a large amount of asymmetrical charges, ion exchange sites (i.e., active sites), pores with high specific surface area enhance the chemically and physically adsorption of the heavy metals in wastewater, such as arsenic, copper and mercury. As such, the composite material can be in an adsorbed state with an adsorbed heavy metal, a desorbed state removing an adsorbed heavy metal, or a regenerated state with a regenerated, highly active metal. Moreover, the composite material of the present disclosure can also enhance catalytic decomposition of hydrogen peroxide, allowing the environment toxicity of hydrogen peroxide to be reduced.

EXAMPLES

The following preparation examples show the method for preparing the porous silicate particles, and the composite materials having a modified layer carried with ferrum, copper or sodium. Moreover, the following test examples illustrate the efficiency of the composite materials having a modified layer carried with ferrum, copper or sodium for adsorbing arsenic, mercury, copper or catalyzing decomposition of hydrogen peroxide.

Preparation Example 1 Preparation of the Porous Silicate Particles

After dissolving the waste LCD panel glass powder in hydrofluoric acid (HF), an inductively coupled plasma-atomic emission spectroscopic (ICP/AES) analysis was performed on the composition and component ratios of the glass. The analytical results are listed in Table 1.

TABLE 1

| | Component | | | | | | |
|---|---|---|---|---|---|---|---|
| | Silicon oxide ($SiO_2$) | Aluminum oxide ($Al_2O_3$) | Boron oxide ($B_2O_3$) | Calcium oxide (CaO) | Magnesium oxide (MgO) | Cesium oxide (SrO) | Polyvalent element |
| Weight % | 58.9 | 17.8 | 8.5 | 3.05 | 3.2 | 8.38 | 0.17 |

Figure 1A:
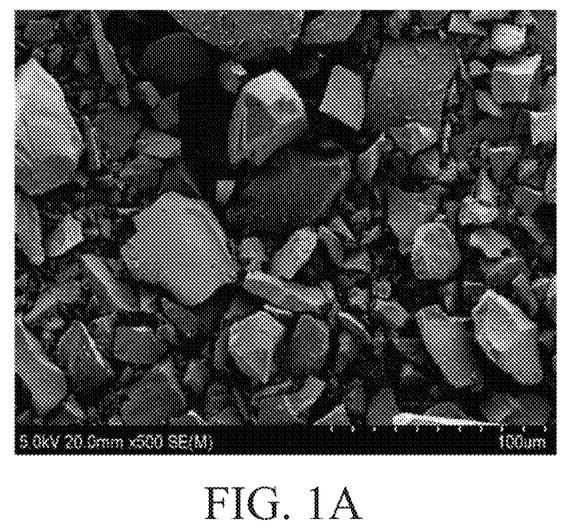
FIG. 1A shows a scanning electron microscopic (SEM) image of the waste LCD panel glass powder.
Figure 1B:
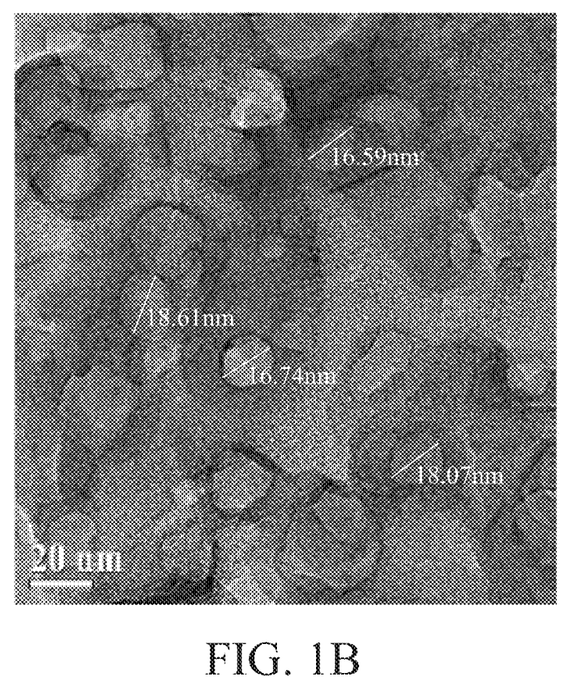
FIG. 1B is an SEM image of the porous silicate particles.

Silicate powder was prepared by using the waste LCD panel glass. 100 g silicate powder was mixed with 200 g sodium carbonate (first metal compound), and then reacted under 1300° C. to obtain the porous silicate particles. The structure of waste LCD panel glass powder and the porous silicate particles were analyzed by scanning electron microscope (SEM) analysis, and the results were respectively shown in FIG. 1A and FIG. 1B. The results showed that the porous silicate particles prepared by the preparation example 1 has nano-scale pores, whereas the waste LCD panel glass powder has no any nano-scale pores.

Preparation Example 2 Preparation of Composite Materials Having a Modified Layer Carried with Ferrum 10 g of porous silicate particles prepared by the preparation example 1 was added into 100 ml of 1% Fe($NO_3$)$_2$ solution to form a mixture. The mixture was put in the reciprocating oscillator, followed by oscillating at 120 rpm for 5 minutes, allowing the mixture to be mixed well. The mixture was then put in the microwave for reacting at 800 W, 5 minutes, allowing the iron ion to be bonded with porous silicate particles well to form the composite materials having a modified layer carried with ferrum. The composite material having a modified layer carried with ferrum was cooled down to room temperature, and then washed with deionized water followed by filtering and drying.

Preparation Example 3 Preparation of Composite Materials Having a Modified Layer Carried with Copper 10 g of porous silicate particles prepared by the preparation example 1 was added into 100 ml of 1% Cu($NO_3$)$_2$ solution to form a mixture. The mixture was put in the reciprocating oscillator, followed by oscillating at 120 rpm for 5 minutes, allowing the mixture to be mixed well. The mixture was then put in the microwave for reacting at 800 W, 5 minutes, allowing the copper ion to be bonded with porous silicate particles well to form the composite materials having a modified layer carried with copper. The composite material having a modified layer carried with copper was cooled down to room temperature, and then washed with deionized water followed by filtering and drying.

Figure 2A:
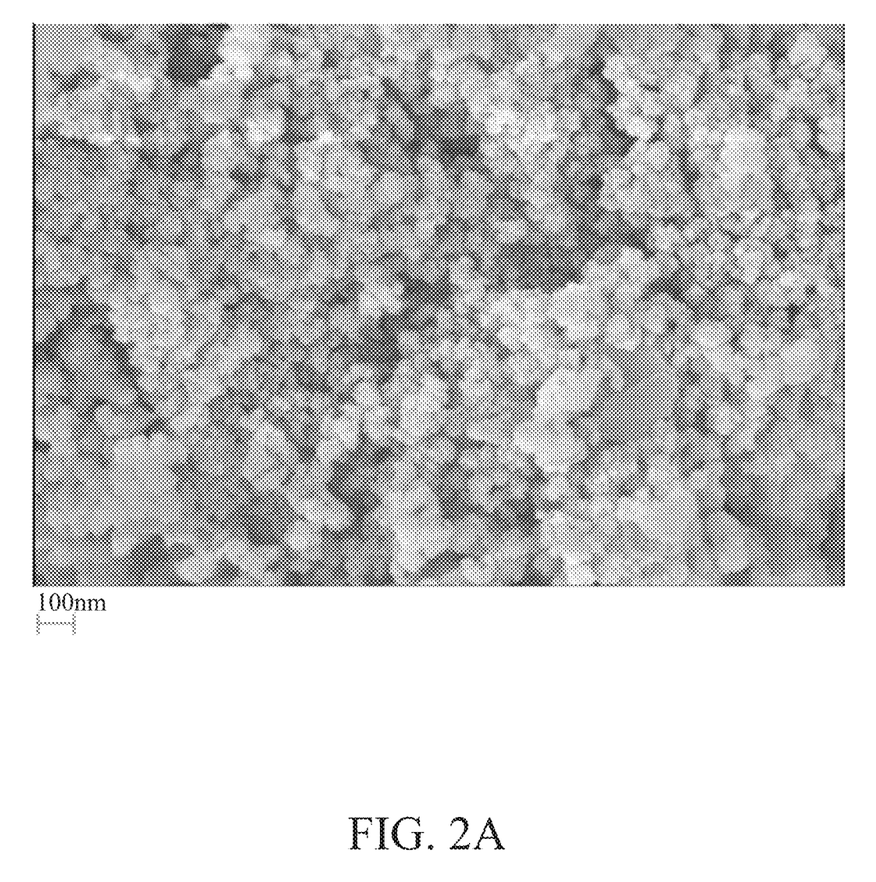
FIG. 2A shows an SEM image of the porous silicate particles.
Figure 2B:
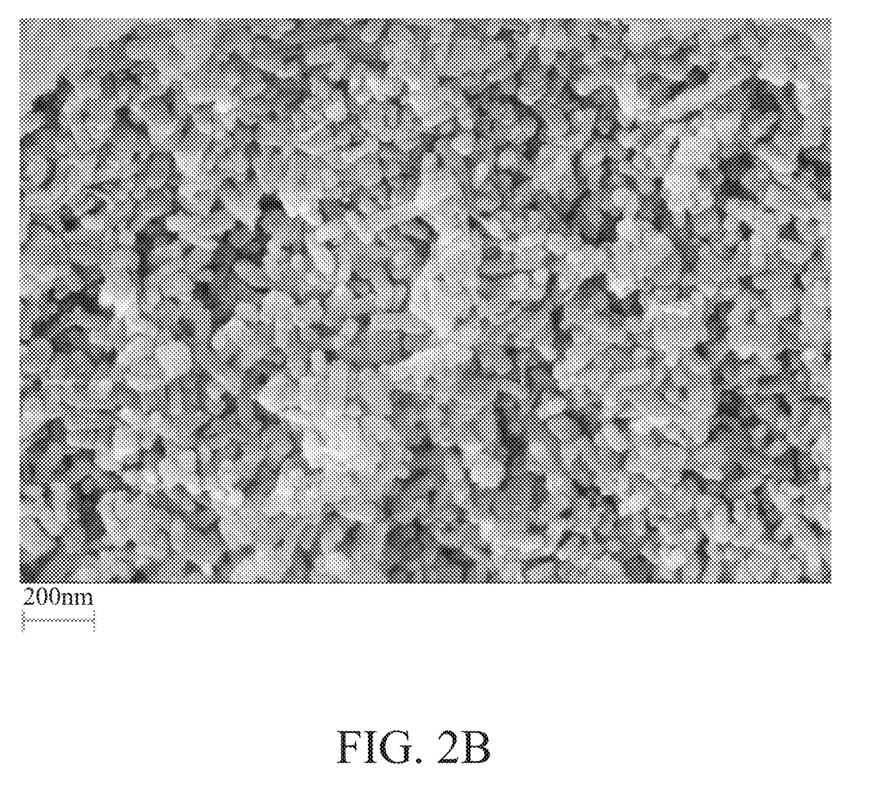
FIG. 2B shows an SEM image of the composite materials having a modified layer carried with sodium.
Figure 2C:
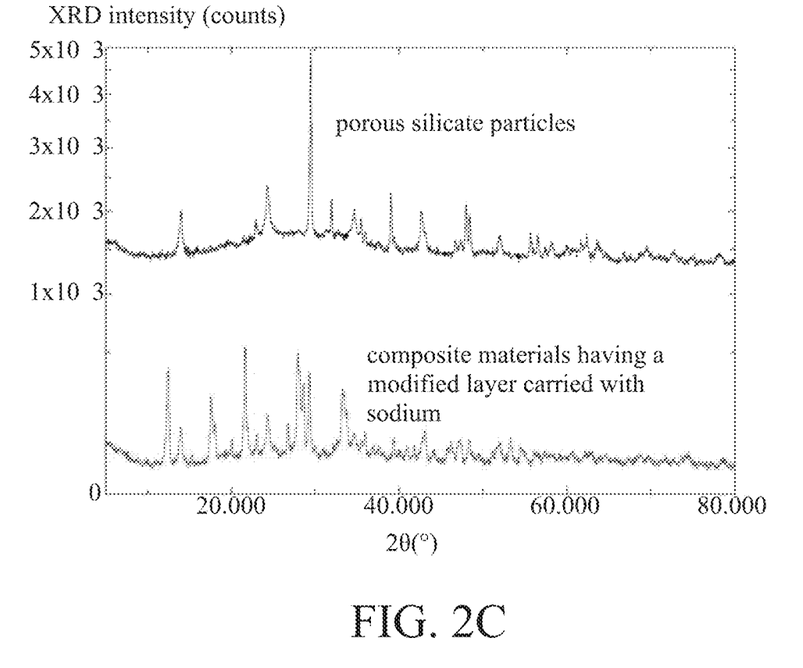
FIG. 2C shows the intensity of X-ray diffraction (XRD) pattern of the porous silicate particles and the composite materials having a modified layer carried with sodium.

Preparation Example 4 Preparation of Composite Materials Having a Modified Layer Carried with Sodium 10 g of porous silicate particles prepared by the preparation example 1 was added into 60 ml of 5% sodium ion containing solution (9:1 ratio of Na2CO3:NaOH) to form a mixture. The mixture was put in an autoclave with a volume of 200 ml, followed by heating at 150° C. for 12 hours, allowing the sodium ion to be bonded with porous silicate particles well to form the composite materials having a modified layer carried with sodium. The composite material having a modified layer carried with sodium was cooled down to room temperature, and then washed with deionized water followed by filtering and drying. FIGS. 2A and 2B respectively showed the SEM image of the porous silicate particles and the composite materials having a modified layer carried with sodium. It could be seen that as compared to the porous silicate particles, the composite materials having a modified layer carried with sodium has layered crystal structures formed on the surfaces of the porous silicate particles. Moreover, FIG. 2C shows the intensity of X-ray diffraction (XRD) pattern of the porous silicate particles and the composite materials having a modified layer carried with sodium. The new diffraction peaks generated in the sample of the composite materials having a modified layer carried with sodium demonstrated that a modified layer had been formed on the surface of the porous silicate particles.

Figure 3:
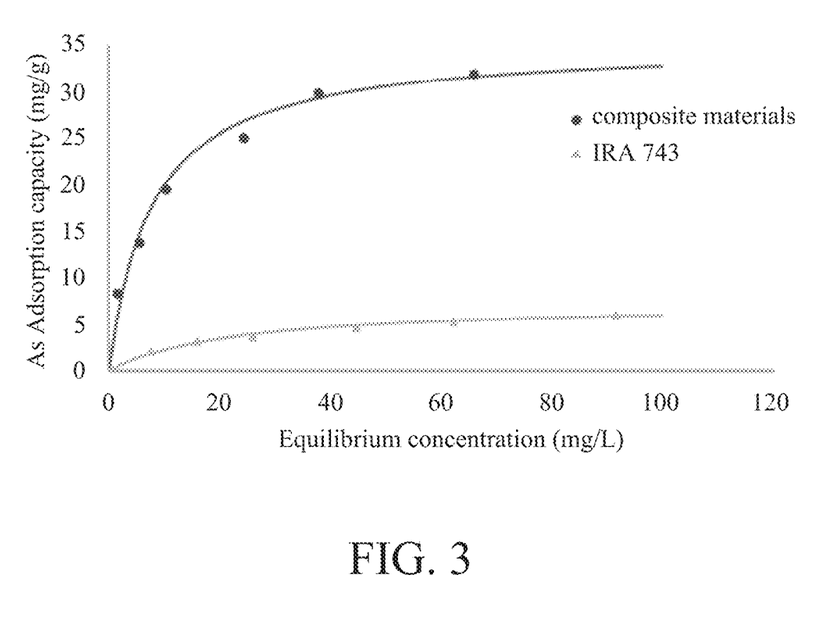
FIG. 3 shows an arsenic adsorption capacity of Amberlite® IRA 743 and the composite materials having a modified layer carried with ferrum.

Test Example 1 Arsenic Adsorption Capacity of the Composite Materials Having a Modified Layer Carried with Ferrum Arsenic (As) ion solution with 10, 20, 30, 50, 70 and 100 ml/L concentration were prepared. The composite material having a modified layer carried with ferrum prepared by the preparation example 2, and commercial ion exchange resin Amberlite® IRA 743 were respectively added into each concentration of As ion solution at room temperature for 24 hours. The composite material having a modified layer carried with ferrum was added into each of the As ion solution at the solid/liquid ratio of 1:1000, and the commercial ion exchange resin was added into each of the As ion solution at a ratio of 1:1000. Results were shown in FIG. 3, and it showed that the arsenic adsorption capacity of the composite materials having a modified layer carried with ferrum was reached to 35.2 mg/g, whereas the arsenic adsorption capacity of the commercial ion exchange resin was 7.3 mg/g. Therefore, it demonstrated that the arsenic adsorption capacity of the composite materials having a modified layer carried with ferrum was 4.8-fold higher than that of the commercial ion exchange resin.

Figure 4:
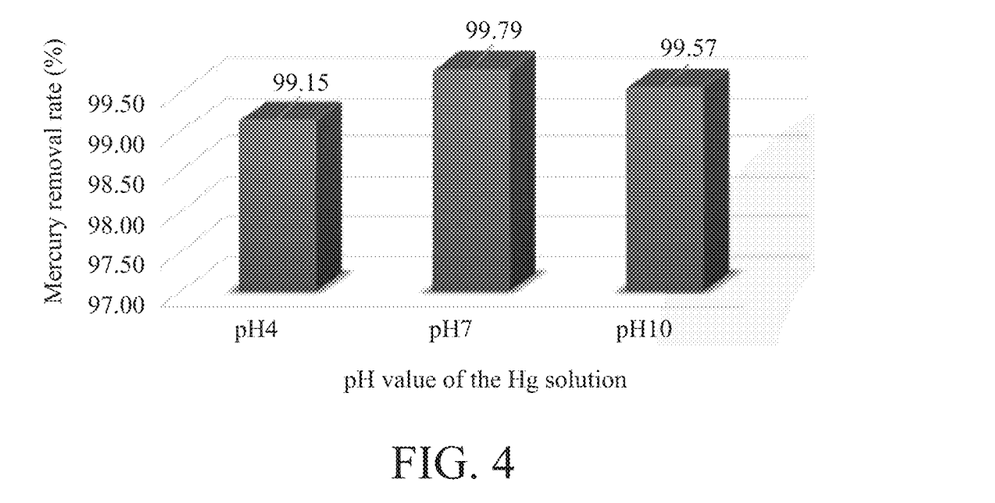
FIG. 4 shows a mercury removal rate of the composite materials having a modified layer carried with copper.

Test Example 2 Mercury Adsorption Capacity of the Composite Materials Having a Modified Layer Carried with Copper 1 L of Hg ion solution with 10 ppm concentration having different pH values of 4, 7 and 10, were prepared. 2 g of the composite material having a modified layer carried with copper prepared by the preparation example 3 was packaged into an adsorption column, followed by adding each of the Hg ion solution having pH value of 4, 7 and 10 at room temperature for 1 hour. The concentration of the Hg ion in each elute of the Hg ion solution having pH value of 4, 7 and 10 was less than 0.1 ppm, and as shown in FIG. 4, the Hg removal rate thereof was respectively 99.15%, 99.79% and 99.57%. Therefore, it demonstrated that the composite materials having a modified layer carried with copper had high mercury adsorption capacity.

Figure 5:
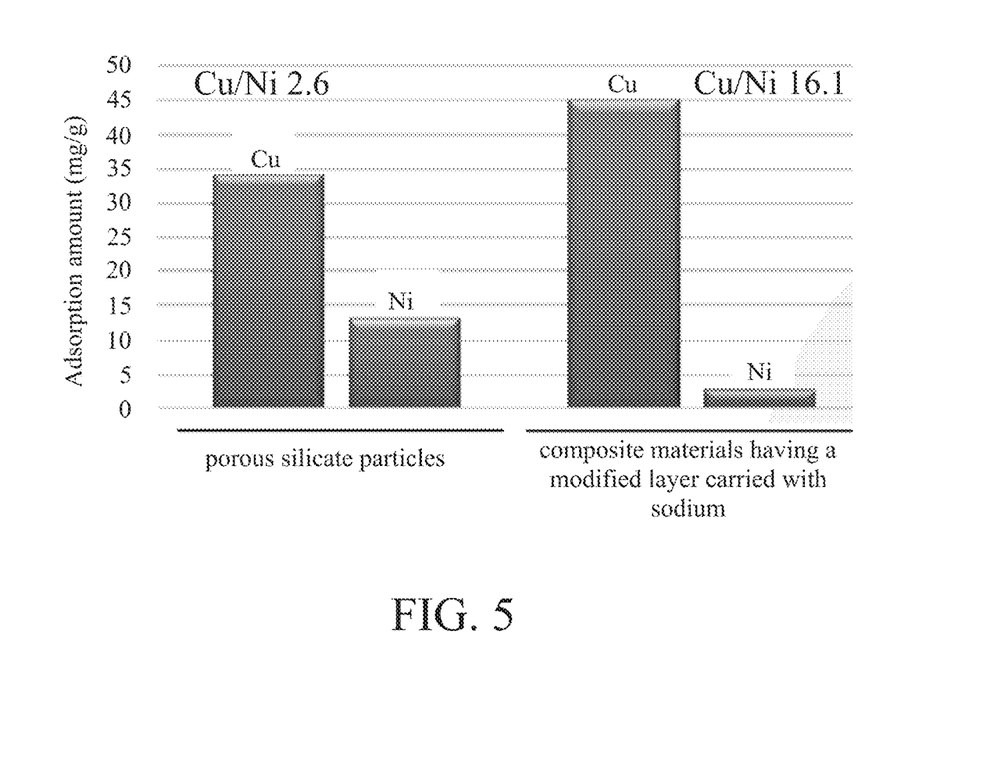
FIG. 5 shows the Cu and Ni adsorption capacity of the porous silicate particles and the composite materials having a modified layer carried with sodium.

Test Example 3 Copper/Nickel Selective Adsorption Capacity of the Composite Materials Having a Modified Layer Carried with Sodium 1 L of 50 ppm Cu ion and Ni ion solution was prepared. The composite material having a modified layer carried with sodium prepared by the preparation example 4, and the porous silicate particles prepared by the preparation example 1 were added into a mixture containing 50 ppm Cu ion solution and 50 ppm Ni solution at room temperature for 1 hour. Results were shown in FIG. 5, and it showed that the composite materials having a modified layer carried with sodium had the high selective adsorption capacity for copper, whereas had nearly no any adsorption capacity for nickel. In addition, the ratio of the copper/nickel selective adsorption capacity of the composite materials having a modified layer carried with sodium was 16.1, and the ratio of the copper/nickel selective adsorption capacity of the porous silicate particles was 2.6. Therefore, it demonstrated that the composite materials having a modified layer carried with sodium had much higher copper/nickel selective adsorption capacity than the porous silicate particles.

Figure 6:
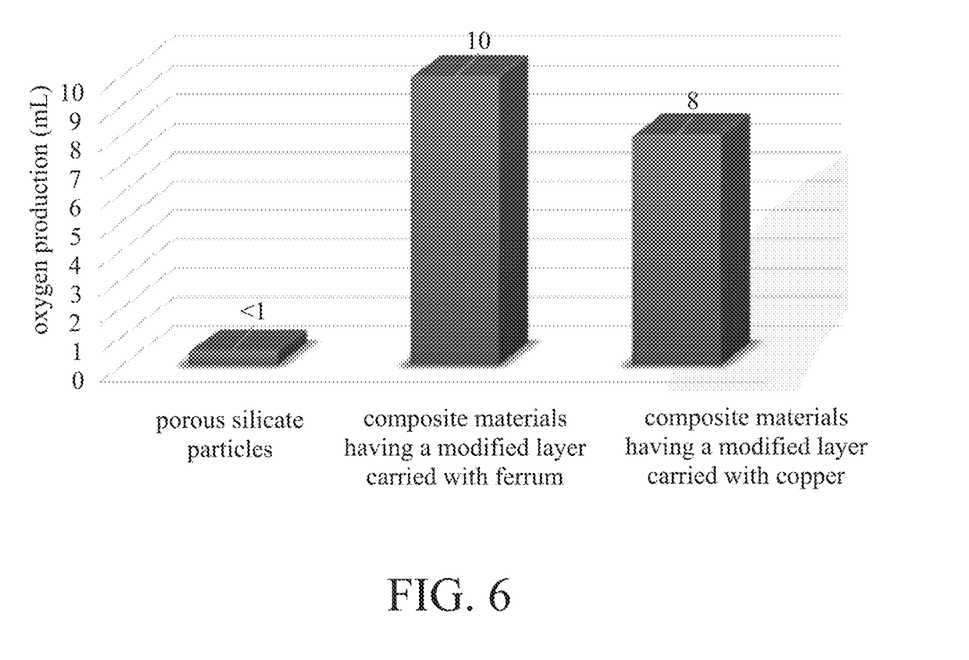
FIG. 6 shows the catalytic decomposition of hydrogen peroxide of the porous silicate particles, and the composite materials having a modified layer carried with ferrum or copper.

Test Example 4 Catalytic Decomposition of Hydrogen Peroxide of the Composite Materials Having a Modified Layer Carried with Ferrum or Copper 100 ml of hydrogen peroxide solution with 35% concentration was prepared. The porous silicate particles prepared by the preparation example 1, the composite material having a modified layer carried with ferrum prepared by the preparation example 2 or the composite material having a modified layer carried with copper prepared by the preparation example 3 were respectively added into the $H_2O_2$ solution at room temperature for 5 minutes. Results were shown in FIG. 6, and it showed that as compared to the porous silicate particles, the composite material having a modified layer carried with ferrum enhanced the catalytic decomposition rate of hydrogen peroxide by 10-fold, and the composite material having a modified layer carried with copper enhanced the catalytic decomposition rate of hydrogen peroxide by 8-fold. Therefore, it demonstrated that the composite materials having a modified layer carried with ferrum or copper could enhance the catalytic decomposition rate of hydrogen peroxide.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A composite material, comprising:
    a plurality of porous silicate particles each having a glass phase structure;
    a first active metal adsorbed into the glass phase structure of the porous silicate particles, wherein the first active metal comprises at least one of sodium, potassium, calcium, and magnesium; and a modified layer containing a second active metal formed on surfaces of the porous silicate particles, wherein the plurality of porous silicate particles have an average pore diameter of from 3 nm to 50 nm.

2. The composite material of claim 1, wherein the porous silicate particles are prepared from soda-lime glass or LCD panel glass as a raw material.

3. The composite material of claim 1, wherein the porous silicate particles comprise silicon oxide, aluminum oxide, barium oxide, cesium oxide and boron oxide.

4. The composite material of claim 3, wherein the silicon oxide and the aluminum oxide in components of the porous silicate particles are at a weight ratio of from 2 to 5.

5. The composite material of claim 1, wherein the second active metal comprises at least one of ferrum, copper, group IA elements and group IIA elements.

6. The composite material of claim 1, wherein the porous silicate particles have a specific surface area of from 50 $m^2/g$ to 400 $m^2/g$.

7. The composite material of claim 1, wherein the modified layer has layered crystal structures formed on the surfaces of the porous silicate particles.

8. The composite material of claim 7, wherein the porous silicate particles have a specific surface area of from 50 $m^2/g$ to 100 $m^2/g$.

9. The composite material of claim 8, wherein the second active metal is selected from at least one of group IA elements and group IIA elements.

10. The composite material of claim 1, wherein pore diameters of at least 60% pore volume of the porous silicate particles are in a range of from 3 nm to 50 nm.

11. The composite material of claim 1, wherein the density of porous silicate particles is 0.5 $g/cm^3$ to 0.8 $g/cm^3$.

12. The composite material of claim 1, wherein the modified layer has a weight ratio of between 0.1 wt % to 2 wt % based on a total weight of the composite material.

* * * * *